Patented July 8, 1941

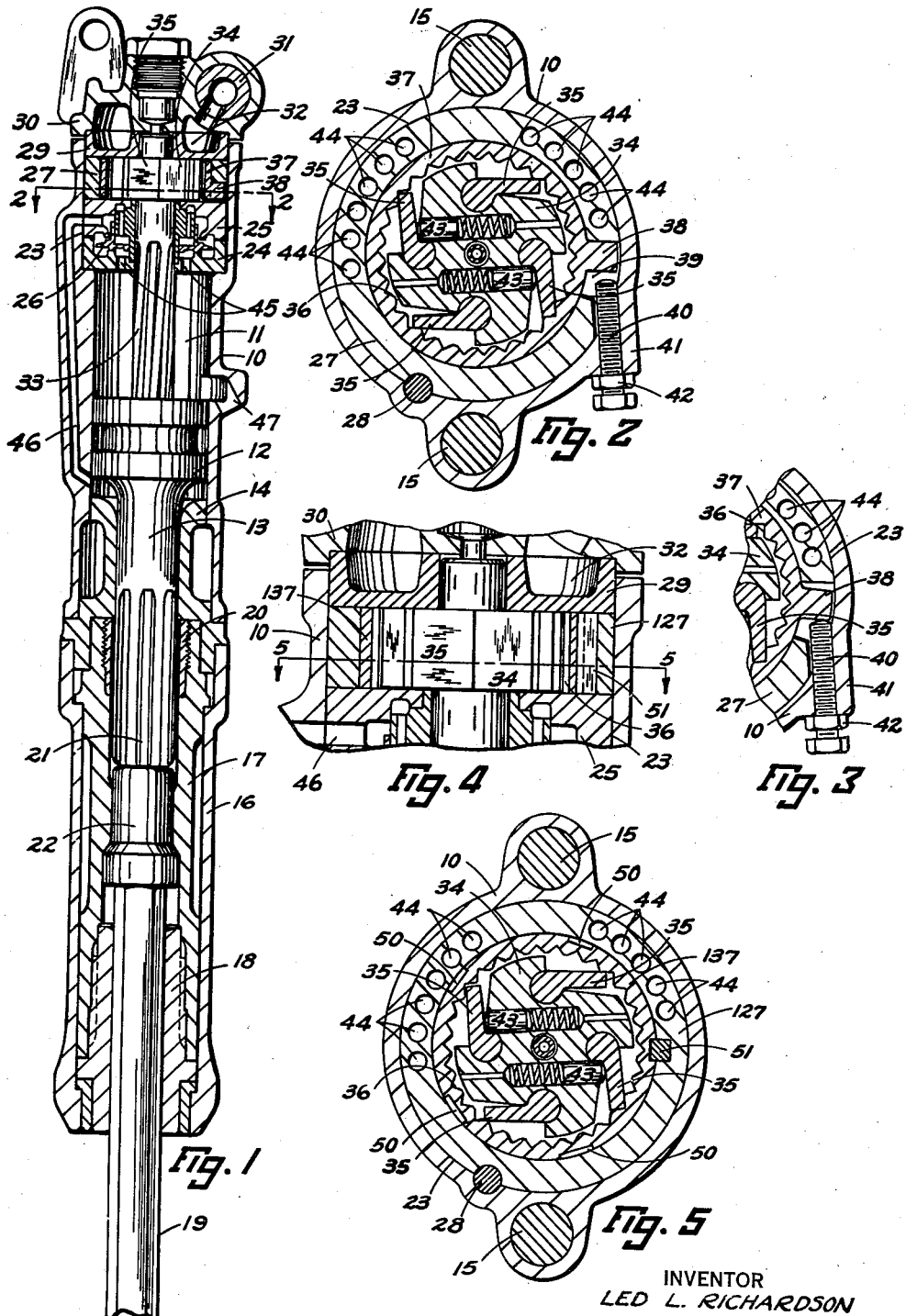

2,248,824

UNITED STATES PATENT OFFICE 2,248,824

ROCK DRILL ROTATION MECHANISM

Led L. Richardson, Garfield Heights, Ohio, assignor to The Cleveland Rock Drill Company, Cleveland, Ohio, a corporation of Ohio Application March 9, 1940, Serial No. 323,231

3 Claims. (Cl. 121—7)

This invention relates broadly to fluid actuated rock drills of the reciprocatory piston type. More particularly, this invention relates to improvements in the rotation mechanism usually incorporated in such rock drills for rotating the drill steel, which mechanism is known to include a rifle stem cooperating with a corresponding rifled nut fixed within the reciprocatory piston. The rifled stem is provided with a head having pawls operatively mounted therein for engagement with a ratchet ring in a manner causing rotation of the piston during its rearward strokes, and rotation of the rifled stem during the forward strokes of the piston. From the piston, rotation is transmitted to the drill steel by any suitable means such as a chuck. In practice, the speed at which the drill steel is rotated has been found to be important if maximum drilling speed is to be obtained. For instance, when drilling in a relatively hard rock formation, it is important to rotate the drill steel at a lower rate of speed than when drilling in relatively soft formation. Heretofore, in order to change the rotary speed of the drill steel, it was necessary for the operator to change the rifled stem and nut, an operation which necessitated the disassembling and subsequent reassembling of the entire machine. In addition thereto, the manufacturers of rock drills were required to make and keep in stock for each model manufactured, rifled stems and nuts of different rifle angle. It is therefore one object of this invention to produce a rock drill rotation mechanism with adjustable means for controlling the rotary speed of the drill steel.

Another object of this invention is to provide such rotation mechanism with simple, efficient and compact means adjustable from the exterior of the rock drill for selectively controlling the rotary speed of the drill steel.

Other objects more or less ancillary to the foregoing reside in the specific construction and aggroupment of the elements peculiar to this structure, as will become apparent from a more complete examination of this specification.

In the drawing:

Fig. 1 is an longitudinal sectional view of a rock drill embodying the invention.

Fig. 2 is an enlarged cross sectional view taken in a plane indicated by line 2—2 in Fig. 1.

Fig. 3 is a portion of the view shown in Fig. 2, illustrating a movable part in another position.

Fig. 4 is an enlarged portion of the rock drill shown in Fig. 1, illustrating a modification of the invention.

Fig. 5 is a cross sectional view taken in a plane indicated by line 5—5 in Fig. 4.

Referring to the drawing in which like symbols designate corresponding parts throughout the several views, 10 represents a cylinder formed with a piston chamber 11 having, reciprocably mounted therein, a piston 12 formed with a shank 13 extending downwardly therefrom and slidable through a bushing 14, which bushing forms the lower end of the piston chamber 11. Clamped to the cylinder 10 by two side rods 15, there is a front housing 16 having rotatable therein a chuck sleeve 17. The front end of this sleeve is adequately machined to receive a chuck bushing 18 held therein against rotation relative thereto and within which is slidably and nonrotatably mounted the shank of a drill steel 19. Detachably secured within the other end of the sleeve 17, there is a chuck nut 20 which is internally splined for cooperative engagement with straight splines 21 formed on the front end portion of the piston shank 13. Intermediate its ends, the sleeve 17 has mounted therein a tappet 22 adapted to transmit impacts from the piston 12 to the drill steel 19.

The upper end of the cylinder 10 is counterbored as at 23. On the bottom of this counterbore rests a valve cap 24, and on the latter a valve casing 25 within which is reciprocably mounted a fluid actuated valve 26 for controlling admission of the motive fluid into the piston chamber 11. Resting on the valve casing 25, there is a ratchet ring casing 27 which is itself shaped like a ring and is held against rotation relative to the cylinder 10 by a dowel pin 28.

Seated on the ratchet ring casing 27, there is a bearing plate 29 engaged by a back head 30 which is clamped thereon through the side rods 15. A throttle valve 31 is rotatably mounted in the back head 30 for controlling admission of the motive fluid into a cavity 32 formed between the bearing plate 29 and the back head 30, from which motive fluid is free to flow to the automatic valve 26 through ports 44 extending through the ratchet ring casing 27. From the valve 26, the motive fluid may flow into the rear end of the piston chamber 11 through ports 45, and into the front end through a port 46. After having acted on the piston 12, the motive fluid is free to exhaust from the chamber 11 through an exhaust port 47.

Referring now more particularly to the invention, the rotation mechanism includes a rifled or helically splined stem 33 cooperating with a nut (not shown) screwed within the piston head 12.

The rifled stem 33 extends through the valve mechanism located within the counterbore 23 and is provided, in the ratchet ring casing 27, with a head 34 having pawls 35 pivotally carried thereby and engageable with the internal teeth 36 of a ratchet or toothed ring 37 oscillably mounted within the casing 27. As shown in Fig. 2, the ratchet ring 37 is formed with an integral laterally extending lug 38 located within a slot 39 provided through its casing 27, the width of the lug 38 being materially smaller than that of the slot 39, thereby enabling oscillatory movement of the ring relative to the casing 27. To check the extent of the oscillatory motion of the ring relative to its casing, there is provided a set screw 40 ending within the slot 39 on one side of the lug 38, the set screw being provided with a check nut 42 and fitted within a boss 41 formed on the cylinder 10. The pawls 35 are constantly urged into engagement with the teeth 36 of the ratchet ring 37 by spring pressed plungers 43 operatively mounted within the head 34 of the rifled stem 33.

In the operation of the mechanism, when the throttle valve 31 is positioned as shown in Fig. 1, motive fluid from the throttle valve is free to flow into the cavity 32 and therefrom to the automatic valve 26 through ports 44 extending through the ratchet ring casing 27. From the valve 26 the motive fluid is alternatively admitted into the ends of the piston chamber 11 through the ports 45 and 46 for effecting reciprocation of the piston 12 and the consequential delivery of impacts on the drill steel 19 through the medium of the tappet 22.

As shown in Fig. 1, the stem 33 is provided with right hand helical splines which cooperate with similar splines provided in the rifled nut screwed within the piston 12, thereby tending, during the strokes of the piston toward the valve block 24, hereinafter referred to as its rearward strokes, to rotate the stem 33 and its integral head 34 in a clockwise direction in Fig. 2. In this instance, and if the ratchet ring 37 is assumed held against rotation, the pawls 35 engaging the teeth of the ratchet ring will prevent rotation of the stem 33 in a clockwise direction, thereby causing the piston during its rearward strokes to rotate in the other direction. From the piston, rotation is transmitted to the chuck sleeve 17 through the straight spline connection between the piston shank 13 and chuck nut 20, and from the chuck sleeve 17 to the drill steel 19 through the chuck bushing 18.

During the return or forward strokes of the piston, the stem 33 will be made to rotate in a counterclockwise direction in Fig. 2, which rotation is permitted by the pawls 35 simply riding over the teeth 36 of the ratchet ring 37. In this instance, the piston 12 will be driven forwardly without rotation for delivering impacts to the tappet 22 and drill steel 19 in rapid succession.

The foregoing operation of the rotation mechanism is illustrative of the usual rotation mechanism heretofore incorporated in rock drills, and wherein the rotary speed of the drill steel 19 could be varied only by replacing the rifled stem 33 with one having helical splines of different angle or lead.

Referring now more particularly to the present construction, the rifled stem 33 and its component nut, are preferably provided with relatively steep helical splines, in fact with splines of an angle calculated to result in the highest speed of the drill steel 19 ever desired. In the present construction, this high rotary speed of the drill steel may be obtained by simply turning the set screw 40 until it engages the ratchet ring's lug 38 when positioned as shown in Fig. 2, thereby locking the ratchet ring against rotation and transforming the improved mechanism into an usual rotation mechanism equipped with a fast rifled stem.

When it is desired to reduce the rotary speed of the drill steel, the set screw 40 may be backed away from the ratchet ring's lug 38, thereby enabling limited oscillatory movement of the ring during reciprocation of the piston 12. In this instance, during the rearward or rotary stroke of the piston resulting in the rotation of the drill steel 19, the pawls 35 normally preventing rotation of the stem in a clockwise direction in Fig. 2, will now cause the ring to rotate from the position in Fig. 2 to the position in Fig. 3, thereby enabling the piston 12, for an initial portion of its rearward stroke, to travel without being rotated, and consequently resulting in the rotation of the drill steel 19 at a slower rate of speed. In other words, due to the limited rotation of the ring 37, the rotation mechanism is rendered inoperative during the initial portion of the rearward stroke of the piston 12. By varying, through the set screw 40, the extent of rotation of the ratchet ring 37, it is possible to vary or control the rotary speed of the drill steel 19 irrespective of the reciprocatory speed of the piston 12. During the return or forward strokes of the piston, the splined stem 33 will be made to rotate in a counterclockwise direction in Fig. 2. In this instance, the pawls 35 urged in engagement with the teeth 36 of the ratchet ring 37 by the spring pressed plungers 43, will transmit this rotation in a counterclockwise direction to the ratchet ring 37 until its lug 38 engages the end wall of the slot 39, or until the lug 38 has rotated from the position in Fig. 3 to that in Fig. 2. After the ratchet ring 37 is thus held against further rotation in a counterclockwise direction, the pawls 35 will simply ride over the teeth 36 of the ratchet ring to enable further rotation of the stem 33.

In the modification of the invention illustrated in Figs. 4 and 5, the ratchet ring 137 has its peripheral wall provided with a plurality of equally spaced longitudinally extending keyway 50, while the ratchet ring's casing 127 has its inner wall carrying a stationary key 51. The width of one of the keyways 50 is equal to that of the key, thereby preventing rotation of the ring when the key is located within this last keyway. The other keyways are all of different width greater than that of the key 51, thereby enabling rotation of the ratchet ring 137 to an extent depending upon the width of the keyway within which the key is located. In this modification, the rotary speed of the drill steel 19 may be governed by changing the position of the ratchet ring 37 relative to the key 51, or in other words, by positioning the key in one or the other of the keyways 50.

From the foregoing explanation, it will be understood that with the present improved rotation mechanism, it is possible to selectively control the rotary speed of the drill steel 19 without necessitating the replacement of the rifled stem 33 and its component nut. The construction comprising the set screw 40, affords readily adjustable drill steel rotation controlling means, operable without in any way affecting the other operating parts of the machine.

Although the foregoing description is necessarily of a detailed character, in order to completely set forth the invention, it is to be understood that the specific terminology is not intended to be restrictive or confining and it is to be further understood that various rearrangements of parts and modifications of structural detail may be resorted to without departing from the scope or spirit of the invention as herein claimed.

I claim:

1. In a rock drill, a cylinder having a piston reciprocable therein and capable of rotation, a rotation mechanism for said piston including a ratchet ring oscillably mounted in said cylinder, a rifled stem engaged with said piston, pawls operatively connecting said ring to said stem, and means for controlling the extent of the oscillatory movement of said ring during the normal operation of said mechanism.

2. In a rock drill, a cylinder, a reciprocatory piston in said cylinder capable of rotation, a rotation mechanism for said piston including a rifled stem operatively associated therewith, a head on said stem, a tooth ring surrounding said head, pawls carried by said head for engagement with the teeth of said ring in a manner effecting rotation of said piston during its strokes in one direction and of said stem during strokes of said piston in the other direction, said ring being capable of limited oscillatory movement, and means for selectively controlling the extent of said oscillatory movement.

3. In a rock drill, a cylinder, a reciprocatory piston in said cylinder capable of rotation, a rotation mechanism for said piston including a stem extending partway into said piston, a helical spline connection between said piston and stem normally effecting rotation of said piston or stem upon reciprocation of said piston, a head on said stem, a toothed ring surrounding said head, pawls carried by said head for engagement with the teeth of said ring to prevent rotation of said stem in one direction and enable rotation of said piston in the other direction, said ring being capable of limited rotation with said head, and means for varying the extent of rotation of said ring with said head.

LED L. RICHARDSON.